Aug. 25, 1959   R. D. CAMPBELL   2,901,609
DIFFERENTIATOR
Filed May 2, 1956
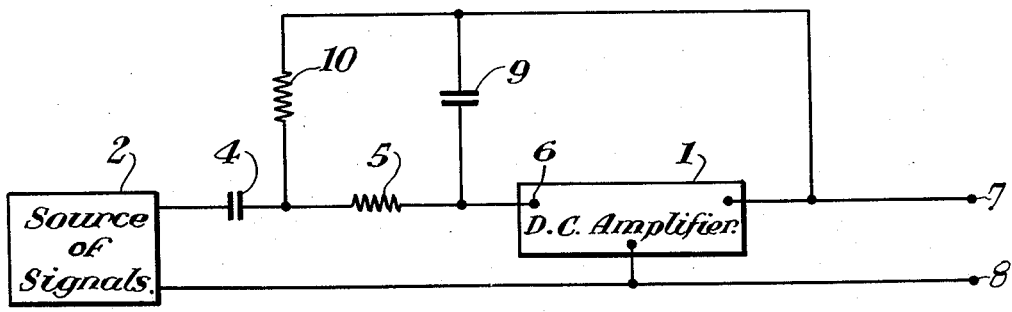
INVENTOR.
Richard D. Campbell.
BY W. L. Stout.
HIS ATTORNEY

United States Patent Office 2,901,609
Patented Aug. 25, 1959

2,901,609

DIFFERENTIATOR

Richard D. Campbell, Harmarville, Pa., assignor to Westinghouse Air Brake Company, Wilmerding, Pa., a corporation of Pennsylvania Application May 2, 1956, Serial No. 582,249

2 Claims. (Cl. 250—27)

This invention relates to a differentiator and more particularly to a differentiator of reduced band width.

It is sometimes necessary to differentiate slowly varying electrical signals that are contaminated by short-time interval random variations. In such cases it is often desirable to be able to measure the slowly varying variations and to simultaneously prevent the short-time interval random variations from affecting the measurement.

Applications of this type occur in attempting to measure the acceleration of a moving object by using radar adapted to respond to the Doppler principle. The radar apparatus provides a signal that has a frequency which is proportional to the velocity of the object. The frequency is usually continuously measured by a frequency measuring circuit. The frequency measuring circuit provides a unidirectional signal that is proportional to the velocity of the object. The acceleration of the object is measured by differentiating the voltage supplied by the frequency meter. This voltage is usually contaminated by short-time interval random variations. These random variations are caused by many factors. For example, the electromagnetic energy of the radar apparatus may travel paths of different lengths or be reflected by more than one object moving at different velocities, etc.

Therefore, it is an object of my invention to provide a differentiator for differentiating slowly varying electrical signals that are contaminated by short-time interval random varying variations and which will respond only to the slowly varying variations.

In practicing my invention I provide a direct current amplifier with a specially arranged network between the source of signals to be differentiated and the amplifier and with a specially arranged feed-back circuit between the output circuit and the input circuit of the amplifier. This arrangement provides a circuit that is responsive to slowly varying electrical signals and is irresponsive to short-time interval rapidly varying variations.

Other objects of my invention and features of novelty thereof will be apparent from the accompanying decription taken in connection with the accompanying drawing.

The accompanying drawing is a diagrammatic view of differentiating apparatus comprising my invention.

Referring now to the drawing, the reference character 1 designates a direct current amplifier. A source of signal 2 supplies a voltage which it is desired to differentiate. This voltage may be contaminated with short-time interval rapidly varying variations, commonly referred to as noise. Such source of signals may be derived from a radar system adapted to measure the velocity of an object by employing the Doppler principle. The radar system provides a voltage that is proportional to the velocity of the object and which voltage may be contaminated with noise. It is desired to differentiate the voltage without responding to the noise or rapidly varying variations.

The source of signals is connected through a capacitor 4 and a resistor 5, connected in a series arrangement, to an input terminal 6 of the input circuit of the amplifier. The differentiated voltage appears between the terminals 7 and 8 of the output circuit of the amplifier. A portion of the differentiated voltage is fed back to the input circuit of the amplifier through a specially arranged feedback loop consisting of two feed-back paths. The first feed-back path comprises a capacitor 9, which is connected between the output circuit of the amplifier and the input circuit. The second feed-back path comprises a resistor 10 which is connected between the output circuit of the amplifier and a common junction of capacitor 4 and resistor 5.

Capacitor 4 and resistor 10 act in combination with the amplifier to differentiate the low frequency signal voltages supplied by the source of signals. Resistor 5 and capacitor 9 provide filtering action in the feed-back loop to alter the response of the basic differentiator for signals of high frequency or short-time interval variations applied to the input terminals. The resulting apparatus is sensitive to the rate of change of input signals that vary slowly but attenuates rapidly varying short-time interval variations. Therefore, if the signal applied to the differentiator is composed of a slowly varying voltage that is contaminated with rapidly varying short-time interval variations, the output voltage is proportional to the rate of change of the slowly varying voltage and is free of interference from the rapidly varying variations.

Although a particular embodiment of the invention is illustrated, it will be understood that various changes and modifications may be made therein within the scope of the appended claims without departing from the spirit and scope of my invention.

Having thus described my invention, what I claim is:

1. Differentiating apparatus for a source of electrical signals comprising an amplifier provided with an input circuit and an output circuit, a coupling network including a first capacitor and a first resistor connected in a series relationship between said source of signals and said input circuit with the capacitor connected to the source of signals and the resistor connected to the input circuit, and a feed-back network including a second capacitor connected between said output circuit and said input circuit and a second resistor connected between said output circuit and the junction of said first resistor and said first capacitor, whereby the amplifier is responsive to slowly varying variations of said source of signals and is substantially irresponsive to rapidly varying variations of said source of signals.

2. Differentiating apparatus for relatively slowly varying direct current signals, said varying signals being contaminated by randomly varying short-time interval variations, comprising, in combination, a direct current amplifier having an output terminal and an input terminal, a first resistor, a first capacitor, means for applying said varying signals to said amplifier input terminal through said capacitor and resistor in series, a second resistor, means for coupling the output terminal of said amplifier to its input terminal through said first and second resistors in series, and a second capacitor connecting said output terminal to said input terminal, whereby said slowly varying signals are differentiated and said short-time interval variations are attenuated.

References Cited in the file of this patent

UNITED STATES PATENTS

| | | |
|---|---|---|
| 2,324,797 | Norton | July 20, 1943 |
| 2,412,227 | Och et al. | Dec. 10, 1946 |
| 2,459,046 | Rieke | Jan. 11, 1949 |
| 2,562,792 | James | July 31, 1951 |
| 2,666,135 | Barton | Jan. 12, 1954 |
| 2,773,641 | Baum | Dec. 11, 1956 |

FOREIGN PATENTS

| | | |
|---|---|---|
| 1,108,111 | France | Aug. 24, 1953 |